United States Patent Office 3,103,712
Patented Sept. 17, 1963

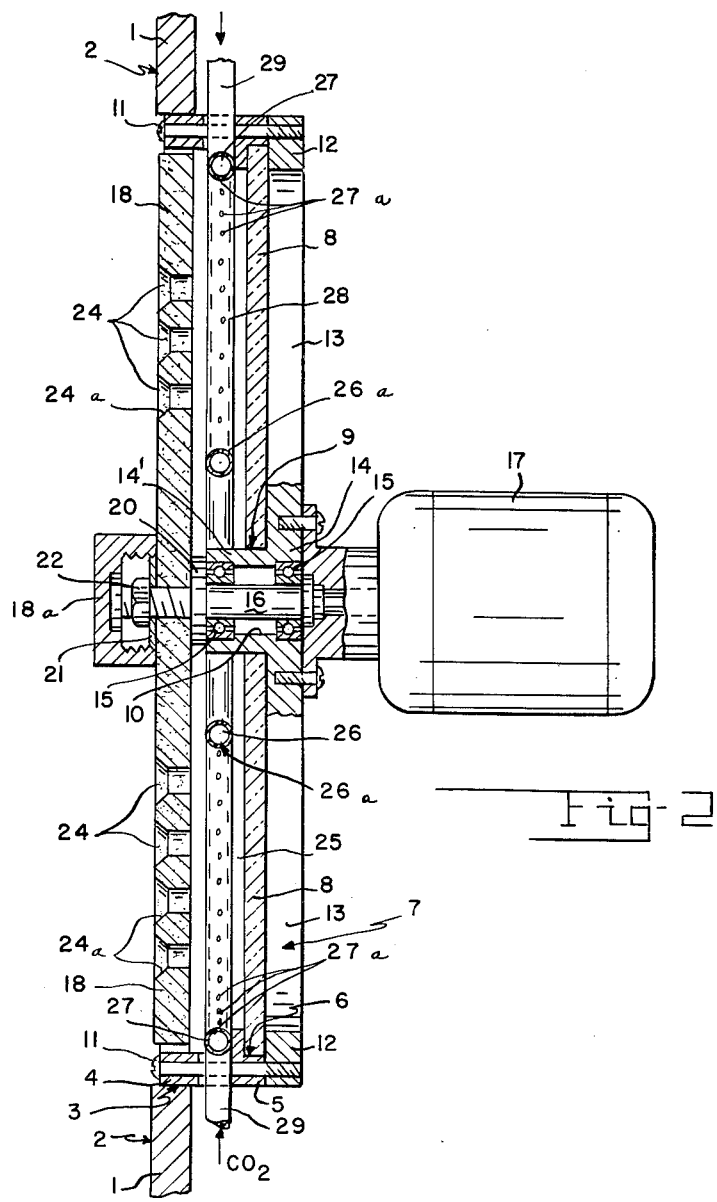

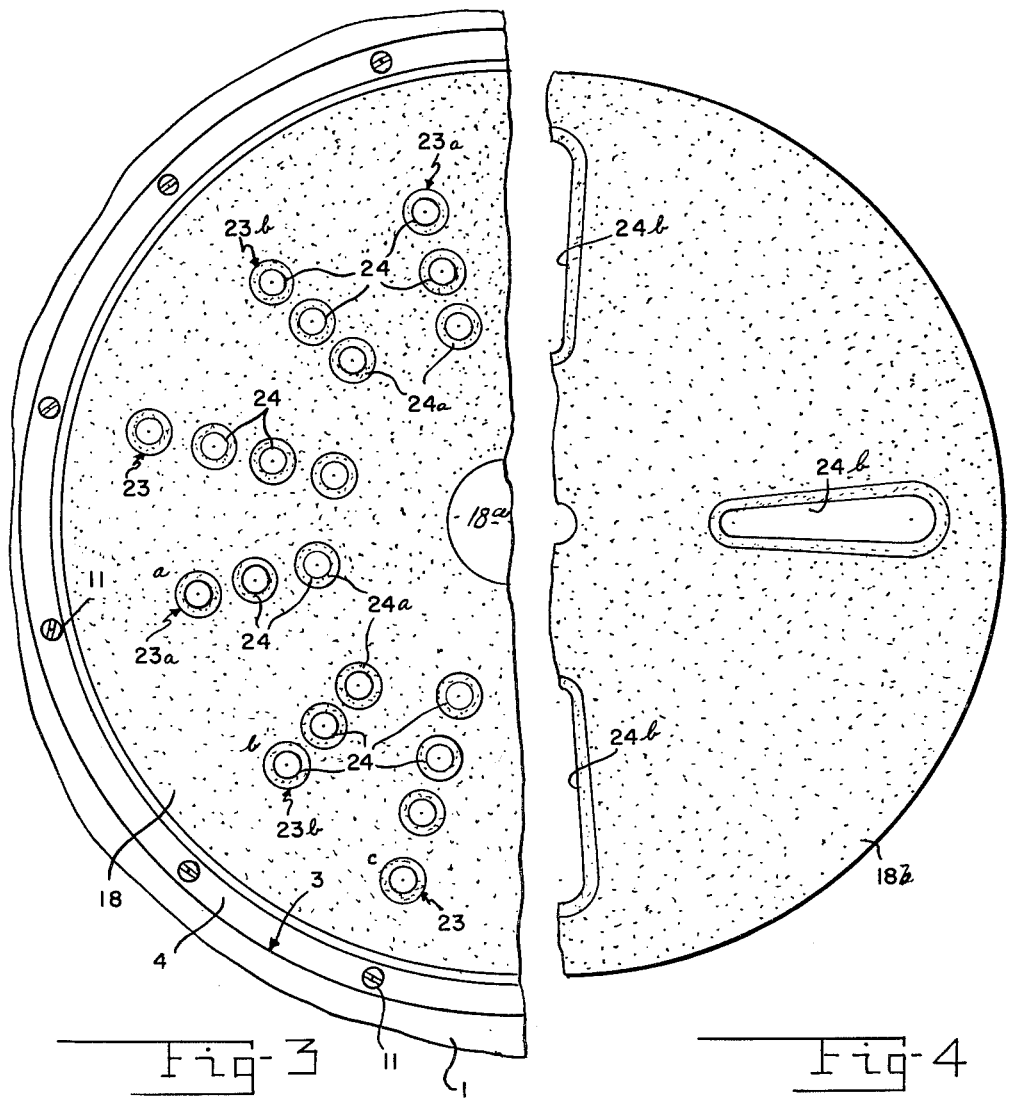

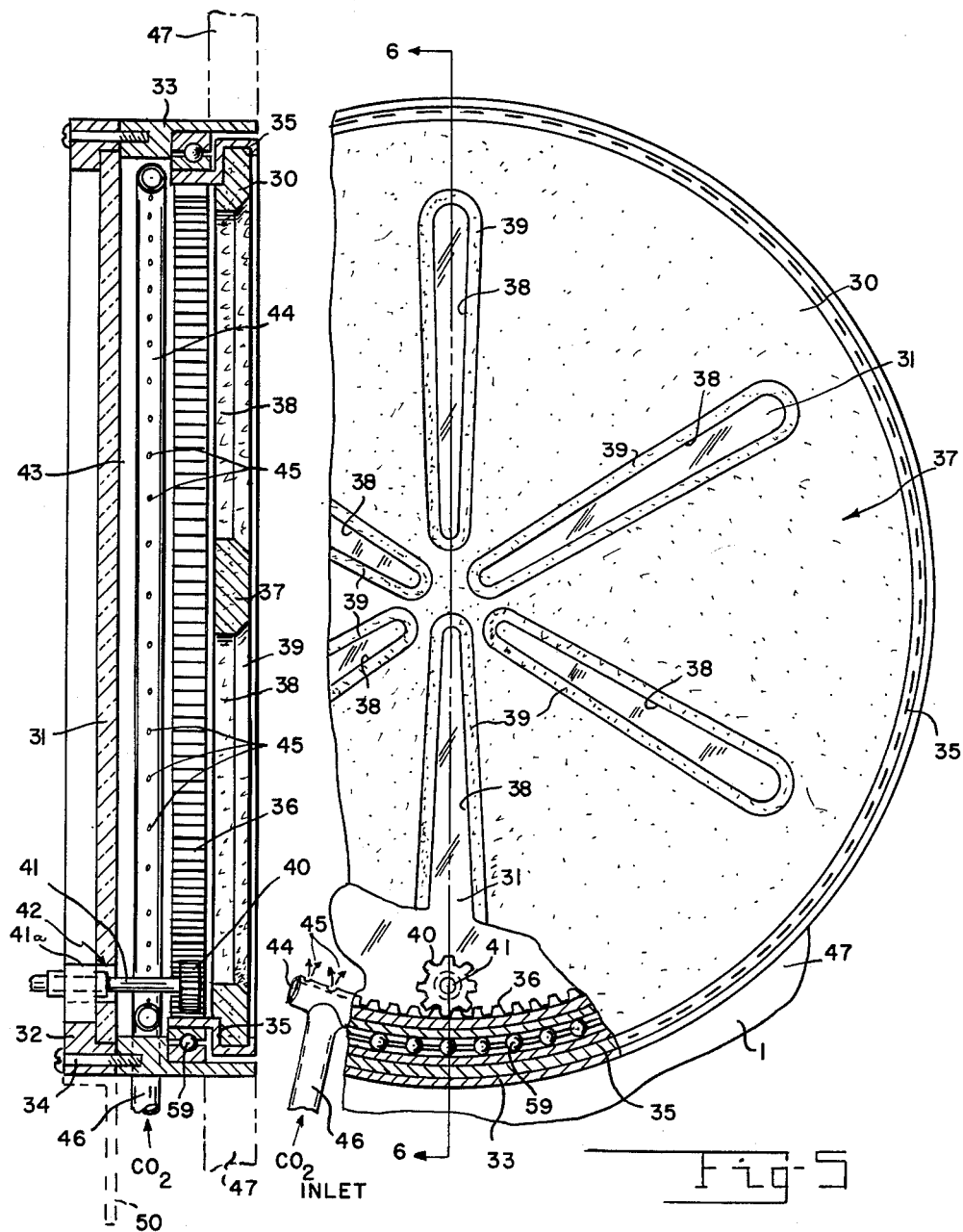

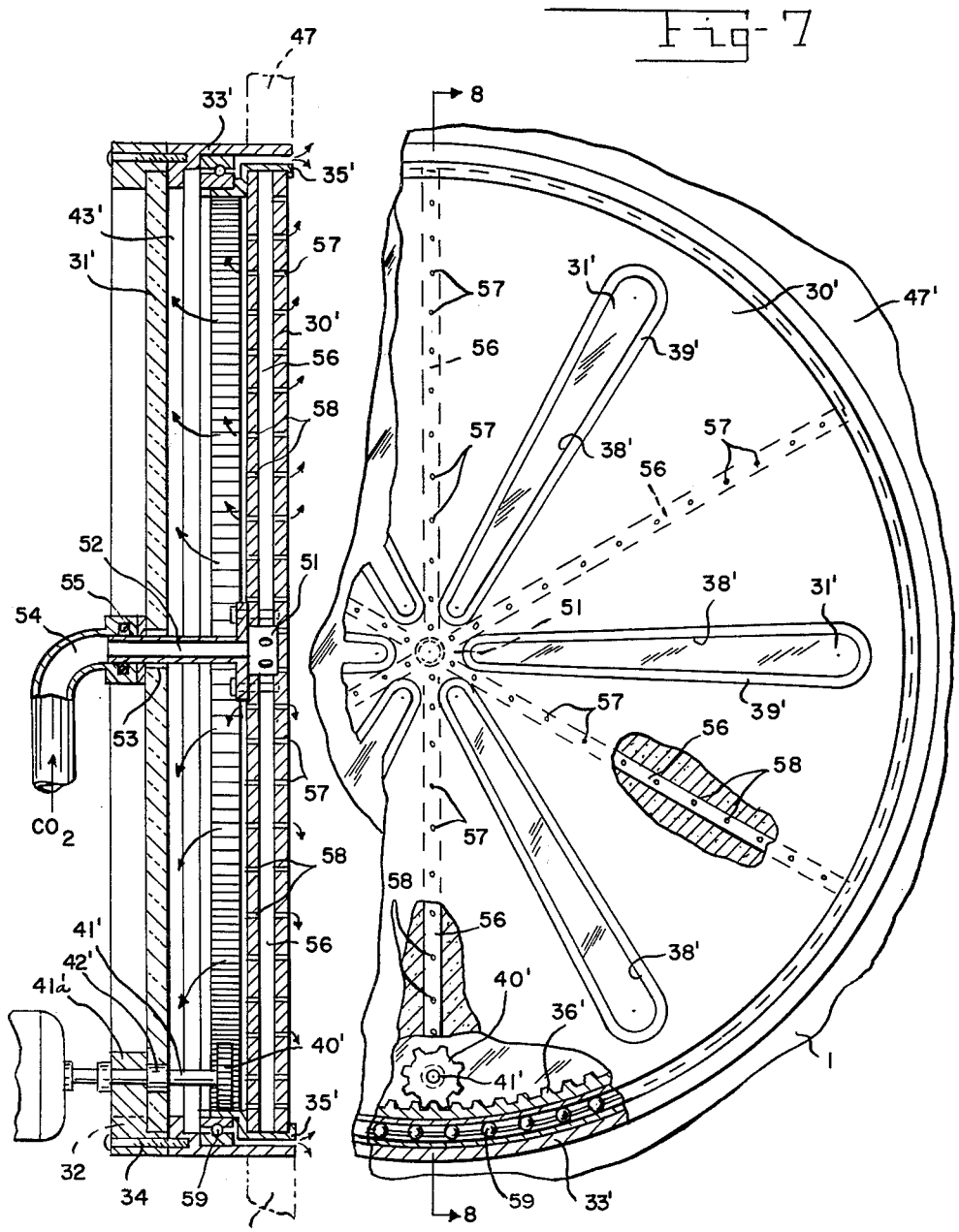

3,103,712
HIGH TEMPERATURE RESISTANT
VIEWING DEVICE
Sidney Allinikov, 202 N. Walnut St., Yellow Springs,
Ohio, and Fred W. Forbes, 734 N. West St., Xenia,
Ohio
Filed May 23, 1961, Ser. No. 112,131
9 Claims. (Cl. 20—40)
(Granted under Title 35, U.S. Code (1952), sec. 266)

The invention described herein may be manufactured and used by or for the United States Government for governmental purposes without the payment to us of any royalty thereon.

This invention relates to window opening structures generally and particularly to observation windows for supersonic aircraft for preventing excessive heat from the exterior of an inclosing structure from reaching an observer looking through the observation window.

A further object is the provision of an improved observation window, primarily for observing conditions in a high temperature condition and environment in which excessive radiated heat cannot be transferred through the window.

A still further object is the provision of a shielding device for shielding transparent optical materials from temperature sufficiently high to normally degrade the physical and optical properties of the transparent material beyond practical usefulness and still providing vision through the optical material.

Another object is the provision of a rotary shield of high temperature resistant material, having one or more openings therein, so that when the shield is rotated it is possible to visually observe, or photograph objects in a high temperature environment through the openings in the rotating disk without the transfer of material heat radiation through the disk to an observation window located behind the disk.

A further object is the provision of means for cooling the back surface of the rotating shield and the front surface of an observation window in that area.

A further object is the provision of an annular coolant delivery manifold and pipes disposed between a rotating aperatured or slotted heat shield and the viewing glass behind the shield for injecting a coolant such as low temperature $CO_2$ between the shield and the glass for affecting cooling effect on the shield and glass.

A further object includes the provisions of a rotary circular shield member made of hard heatproof material such as cement asbestos board having a plurality of radially disposed openings or slits therethrough and a glass or transparent heat resistant viewing circular plate disposed behind the shield in spaced parallel relation therefor, and a circular coolant delivery conduit disposed between the shield and the glass adjacent the periphery of the glass, having a multitude of radial coolant delivery apertures therein extending around the inner periphery of the conduit facing radially inward toward the rotary axis of the shield, for delivery under pressure of a coolant into the space between the rotary shield and glass toward the rotary axis of said shield, for cooling the adjacent parallel surfaces of the shield and the glass during rotation of the shield.

Other objects and advantages of the invention will become apparent from the following description and accompanying drawings in which like reference characters refer to like parts in the several figures.

In the drawings:
FIG. 1 is a plan or elevational view looking toward the rear or viewing side of our improved high temperature viewing device, parts being broken away to show intermediate parts between the rear and front sides thereof;

FIG. 2 is a substantially transverse section view taken about on the plane indicated by line 2—2 in FIG. 1, the motor or power means being shown in elevation;

FIG. 3 is a "half" plan view of our improved device looking toward the front or heat shield face thereof;

FIG. 4 is a plan view of half of a modified form of rotary heat shield disk;

FIG. 5 is a fragmentary plan view of a modified form of high temperature resistant viewing device looking toward the front or rotary heat shield face of the device;

FIG. 6 is a transverse sectional view taken about on the plane indicated by line 6—6 of FIG. 5;

FIG. 7 is a fragmentary plan view similar to FIG. 5, but showing a further modification; and FIG. 8 is a transverse sectional view taken about on line 8—8 of FIG. 7.

Figure 1:
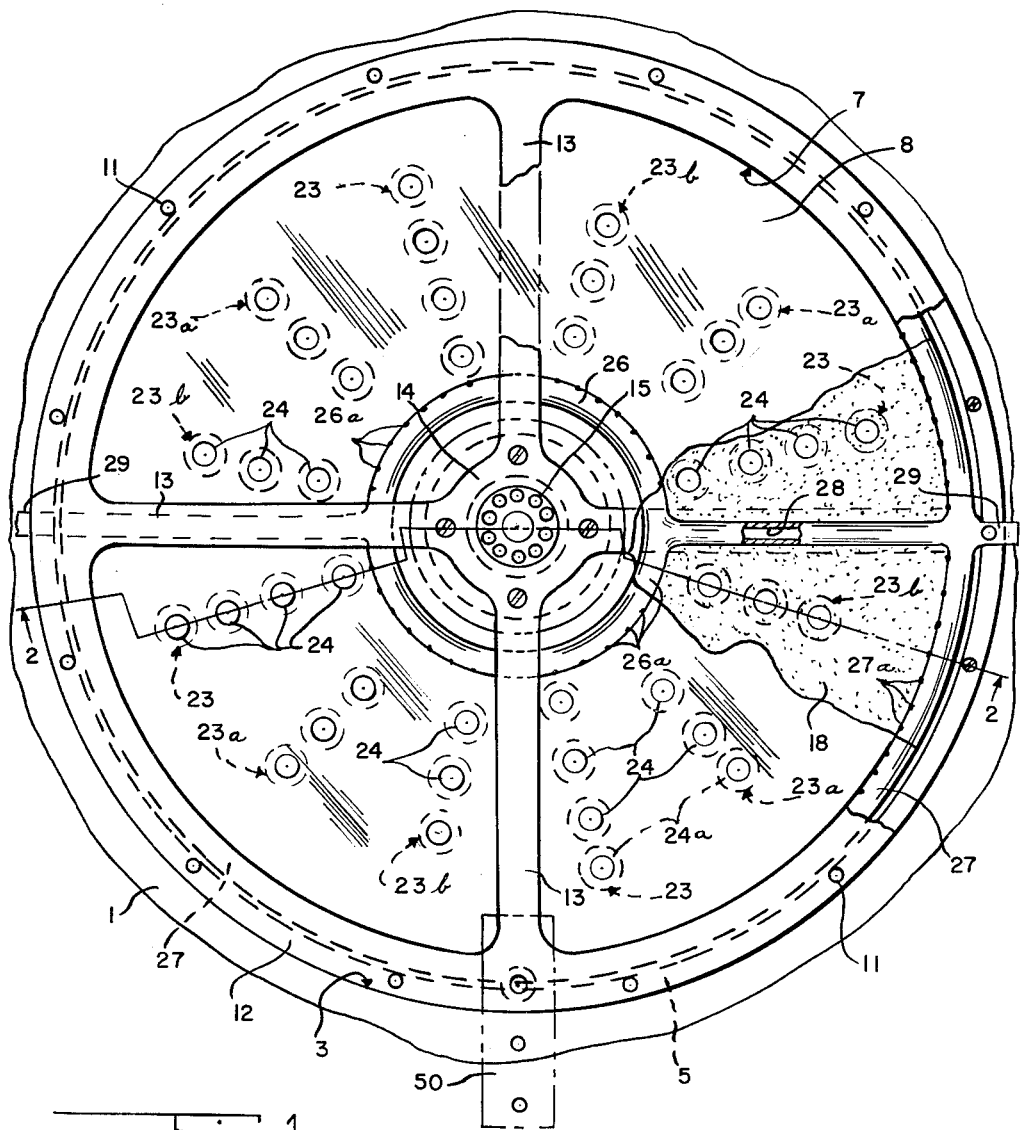

Referring to the drawings, particularly FIGS. 1 and 2, the reference numeral 1 denotes a supporting structure, the outside or front surface 2 thereof adapted for exposure to high temperatures. This supporting structure is formed, as shown, with an annular window opening 3 in which is suitably mounted the improved high temperature resistant viewing device, preferably sealed against pressure leakage by any suitable sealing means.

The viewing device comprises a circular open frame 4 snugly fitting the window opening 3 and includes a superimposed similar open circular frame 5 having an annular rabbet 6 forming a window opening indicated generally at 7, into which is fitted a transparent viewing window closure plate or disk 8, having a central opening 9 therein for accepting therethrough an annular or tubular ball bearing receiving and supporting member 10.

Superimposed on the face of the ring or frame 5 and secured by the fastenings or screws 11 is an annular viewing glass retainer ring 12 having a plurality of radially inwardly extending supporting arms 13, extending to a motor supporting hub portion 14 and having a sleeve extension 14' in which are mounted ball bearing members 15 for centralizing and supporting the drive shaft 16 of a motor 17. The motor 17 may be or any conventional type, including hydraulic, electric, or other types whereby the drive shaft 17 is rotated at the desired speed.

The space between the arms 13, of course, constitute the outward viewing area through the transparent plate 8, between the radial posts or arms 13 where and when the glass viewing plate 8 is exposed.

A comparatively thick heat shield or protective plate, or rotary disk 18 is fixed on the forward end of the motor or drive shaft 16 between the stop collar 20 and the washer 21, being clamped by the nut 22 threaded on the end of the shaft 16.

The heat shield or disk 18 is circular and is rotated at a fairly rapid rate by the motor 17, when the same is energized.

The shield 18 is disposed with its periphery in close proximity to the inner confines of the ring member 5, preferably substantially flush to the outer or heat exposed surface 2, and is preferably fabricated from any suitable strong heat insulating material, such as cement absestos board commercially known as "Transite," or reinforced ceramic composition known commercially as Rene 41 reinforced ceramic construction, or stainless steel honeycomb reinforced ceramic construction. It may be, of course, fabricated from any high temperature resistant material that will have sufficient structural integrity to withstand centrifugal forces imposed by the rotation of these disks.

In the form of the heat shielding disk, shown in FIG. 1 and FIG. 2, radial rows 23, 23ª and 23ᵇ of sight openings 24, best seen in FIG. 2, are provided.

The sight openings 24 in the rows 23, 23ª and 23ᵇ are at different radial positions from the center of rotation of the heat shield 18 so that during rotation of the shield the circular viewing area which is swept by the openings in each of the rows 23, 23ª and 23ᵇ overlap each other, providing a large unobstructed circular viewing or sighting area between, and including the circular area swept by the innermost openings and outermost openings 24 in the rows 23, thus providing substantially unobstructed vision outwardly through the device within the complete area swept by all of the openings 24, when an observer is looking through the device, while the shield disk 18 is being rotated by the motor 17 at, or above, some predetermined fairly rapid rate.

The forward end portion of each of the holes 24 is beveled, as indicated at 24ª in FIGS. 1 and 2.

As before mentioned, the rear face of the heat shield disk 18 is spaced from the front face of the heat resistant viewing disk or glass plate 8 to provide an annular cooling chamber therebetween, indicated at 25.

Located in the cooling chamber 25 are inner and outer concentric coolant delivery pipes 26 and 27 which are connected together by radially extending manifold means 28. These circular coolant delivery pipes 26 and 27 are rigidly held in concentric relation by the connecting manifolds 28, located behind the arms 13, so as not to obstruct vision through the spider like motor supporting frame 12, between the arms 13 thereof. The coolant supply means or pipes 29 supporting the coils 26 and 27 extend out through suitable openings (or notches) in the annular glass supporting frame 5.

The circular coolant delivery pipes 26 and 27 are drilled or pierced in radial directions toward each other to provide openings 26ª and 27ª, preferably with about .040" holes, spaced circumferentially, about 6° apart, for directing the coolant into the chamber 25 and across the adjacent faces of the viewing glass disk 8 and the rotating heat shield 18. The coolant may be any suitable gas, such as carbon dioxide, nitrogen, or air, and is allowed or caused to pass through the cooling rings 26 and 27, escape through the radial 0.04" holes 26ª and 27ª and escape from the chamber 25 through the openings 24, and to some extent, around the peripheral edge of the heat shield, thus cooling or reducing the surface temperature of the transparent material 8, cooling the back side of the heat shield disk 18, and cooling the edges of the holes 24—24ª, or the elongated slots 24ᵇ, as shown in FIG. 4 when a rotary shield 18ª shown therein is substituted for the disk 18, shown in FIG. 3 having the rows 23, 23ª and 23ᵇ of holes 24 therein.

Rotation of the modified form of disk 18 provides excellent vision through the area swept by the beveled radial slits, while the coolant is delivered by the circular pipes 26 and 27 through the openings 26ª and 27ª thus maintaining the viewing glass plate 8 below undesirable high temperature limits; for instance, in temperature environments in which it is expected to use the shield which is sufficiently high to cause an unprotected transparent window material surface to glow, a condition in aerial photography which would make it impossible to see, or photograph, through the window without the improved shield, or such temperatures which would ordinarily destroy the windows. Of course, where glass such as Pyrex has been indicated as one of the materials which may be used, other transparent materials such as quartz, "Vycor" glass and artificial sapphire may be substituted, where high temperature conditions so demand.

Referring to the modification shown in FIGS. 5 and 6, instead of the heat shield disk therein, indicated at 30, being driven by the central shaft 16 (FIG. 2), it is driven by or from its periphery.

The reference numeral 31 denotes a viewing glass plate or disk which is mounted in a supporting rabbeted ring 32, this ring 32 being superimposed by a main concentric supporting ring 33 secured in place by the screw fasteners 34.

The ring 33 is counterbored to receive an annular ball bearing member 59 in which is mounted for rotation, the heat shield disk mounting ring 35 having an internal ring gear 36. The ring 35 is provided with an annular groove or seat in which the heat shield disk 37 is securely mounted. The heat shielding disk 37, as seen in FIG. 5, is provided with a plurality of radial slots or viewing openings 38 having their outer edges, which are exposed to the high temperature area, beveled as indicated at 39.

The ring gear 36 meshes with a drive pinion 40 fixed on a drive shaft 41 which extends through a suitable opening 42 in the glass disk 31, and is suitably mounted in a bearing 41ª and is driven by a power source (not shown), thus rotating the heat shield at any suitable rate to maintain the "persistency of vision" through the viewing slots 38 as the heat shield 37 is rapidly rotated.

In this form, as in the preferred or previously described form of the invention, the rotary heat shield disk 37 is spaced rearwardly from the viewing disk 31 to provide an annular cooling chamber 43 therebetween.

Extending around the periphery, within the cooling chamber 43, is an annular coolant delivery pipe or conduit 44, having coolant delivery holes 45 extending radially inward toward the rotative center of the heat shield, the holes being spaced circumferentially apart and sized about the same as in the embodiment shown in FIGS. 1 and 2.

The annular coolant delivery conduit 44 is supplied with a suitable coolant gas, as before indicated, from any suitable source through a coolant delivery manifold 46 extending through a suitable opening in the main supporting ring 33.

Since the drive means has been removed, in this latter form, from the center to the periphery of the heat shield disk 38, and the elongated sight openings 38 extend farther toward the center of the disk, the vision, particularly at or near the center portion should be improved, also the field of vision through the slots 38 in the heat shield should be somewhat larger for the same diameter heat shield.

This form, like the other form of the invention, is intended to be inserted and sealed in a circular open back of a panel, wall 47, or heat insulated inclosure, and suitable fastening brackets 50 may be provided, if necessary, to secure the heat shield window in place in the wall or panel or chamber against variations in internal and external pressures.

Referring back to FIG. 2 the heat shield 18 may be provided with a central cap member 18ª to protect the motor shaft 16 and nut 22 from excessive heat transfer.

FIGS. 8 and 9 disclose a further modification of the invention which is primarily concerned with the introduction of the cooling medium between the rotary heat shield and the transparent observation plate or window. Generally the construction, except for the modification of the cooling means, is the same or very similar to that disclosed in the form shown in FIGS. 5 and 6, although it is obvious that the insulator disk shown in FIGS. 1 to 3 may be modified to include the cooling means in the same manner as shown in FIGS. 7 and 8.

In view of the above, the same reference numerals employed in connection with the structure shown in FIGS. 5 and 6 are used in FIGS. 7 and 8 for identical structures, but they are primed (').

As seen in FIGS. 7 and 8, the circular coolant delivery conduit or conduits 26, 27 or 44 (shown in FIGS. 1 to 6) are dispensed with, and instead, the insulation disk 30' is provided with a small central coolant feed chamber 51 which is supplied with the coolant medium from a pipe 52 secured to and projecting rearwardly from the rear face of the disk 30' through the space between the adjacent faces of the insulator disk 30' and the transparent viewing disk 31', the pipe 52 passing through a suitable circular opening 53 in the center of the plate 31' with its outer end rotatably received in a fixed coolant delivery pipe or elbow 54, suitable sealing or gasket means; for instance, O rings 55, being provided therebetween.

Any suitable coolant, such as $CO_2$, under pressure from any suitable source is supplied to the pipe 54, and through the pipe 52 into the central delivery chamber 51.

The insulator disk 30' is suitably "cored" or drilled to provide a plurality of radiating passages or conduits 56 extending radially outward from the central chamber 51 between the front and rear faces of the insulator disk 30' and spaced between the beveled radial slots 38', 39' (or between the rows 23, 23ª and 23ᵇ when the disk 8 is modified to include the passages just mentioned).

The passages 56 extend outwardly, substantially to the periphery of the insulator disk, as the case may be, and the disk is formed with small coolant delivery openings or apertures spaced along the opposite sides of lengths of the passages 56 as indicated at 57 and 58, extending respectively through the front face and through the rear face of the insulator disk.

The coolant circulating through the radial passages 56 tends to cool the insulator disk together with the coolant passing through the small apertures 57 and 58, the passages 58 delivering coolant into the space between the insulator disk and the viewing disk or glass, the passages just mentioned directing the coolant toward or against the front face of the viewing disk 31'.

The front aperture 57 distributes the coolant across the front face of the insulator disk, especially during rapid rotation thereof, forming an outwardly moving "boundary" layer of coolant across the entire outer face of the insulator disk.

During rapid rotation of the insulator disk centrifugal force comes into play on the coolant in the passages 56 tending to increase the coolant circulation and delivery through the passages 56 and apertures 57 and 58, and across both faces of the insulator disk and the viewing plate.

While we have herein shown and described certain preferable forms of the invention, by way of illustration we wish it to be understood that it is not desired to limit or confine the invention to the precise details of construction described and delineated as further modifications and variations may be made without departing from the scope and spirit of the invention as defined in the appended claims.

We claim:

1. In a high temperature shielding observation device, a rotary high temperature insulation heat shield adapted to be exposed on one face to high temperatures, means for rapidly rotating said heat shield, said heat shield having a plurality of spaced viewing openings extending therethrough intermediate its periphery and center adapted to sweep a substantial viewing area covered by the shield between its periphery and center during rapid rotation thereof, a transparent observation plate disposed in spaced parallel relation behind said rotary heat shield to provide a coolant delivery chamber between the adjacent faces of said heat shield and said transparent plate, and coolant delivery conduit means disposed in said chamber in surrounding relation to the rotary axis of said shield having circumferentially spaced coolant delivery openings therein disposed for delivery of a coolant into said chamber across the adjacent faces of said heat shield and said transparent plate, and means for supplying a coolant into said coolant delivery conduit means.

2. In a high temperature shielding observation device, a rapidly rotatable high temperature insulation heat shield having one face thereof adapted to be exposed to high temperatures, said heat shield having a plurality of circumferentially spaced viewing openings formed therethrough, a transparent heat resistant window plate disposed behind said shield in spaced parallel relation thereto, and cooling means disposed between the adjacent spaced faces of said heat shield and said transparent window plate for directing a cooling medium from said cooling means across the adjacent spaced faces aforesaid, for controlling the temperature of said transparent window plate, and means connected to said shield and transparent window plate cooling means for supplying a cooling medium into said cooling means.

3. In a high temperature shielding observation device, an annular support having a circular window opening therein, a circular heat insulation shield member disposed in said window opening for rapid rotation, bearing means carried by said support for rotatably mounting said shield member in said window opening, said shield member having a plurality of sight openings formed therethrough in predetermined circumferentially and radially spaced relation to the rotative axis of said shield to sweep a substantially wide circular viewing area in said window opening between said axis and the periphery of said shield, a transparent viewing window plate fixed in said support in spaced parallel relation to and behind said rotary heat shield for viewing through the shield openings the field swept by said sight openings, a circular coolant discharge conduit disposed between said shield and said window plate concentric to the rotary axis of the shield, adjacent the periphery thereof, said conduit formed with a plurality of closely spaced coolant discharge openings extending radially inward in circumferentially spaced relation toward the rotary axis of said shield for directing a coolant medium radially inward across the adjacent spaced surfaces of said shield and said viewing window for escape of said coolant through the sight openings in said shield, and conduit means connected to said coolant discharge conduit for supplying a coolant medium into said coolant discharge conduit for discharge through said openings, during rotation of said shield, and means carried by said support for rotating said shield.

4. In a high temperature shielded observation window, a supporting panel of heat resistant material having a circular observation window receiving opening therein, a circular supporting frame fixed in said window receiving opening having a concentric circular observation opening therein, an apertured heat resistant rotary shield of disc-like form closely defining said observation window opening, bearing means carried by said frame, mounting said shield for rotation in said observation opening, power means for rotating said shield in said bearing means, said shield having a plurality of circumferentially and radially spaced sight openings therethrough adapted to sweep a major portion of the observation opening to provide a circular vision area therethrough from substantially the periphery to the center of said shield during rapid rotation thereof, a transparent viewing window plate fixed in said supporting frame in leakproof relation, in spaced parallel relation to and behind said rotary shield and observation opening to provide a circular cooling chamber, defined at opposite sides by the adjacent spaced faces of said circular rotary shield and said transparent viewing window, and around its periphery by said circular supporting frame, concentrically disposed circular coolant discharge conduit means fixed in said cooling chamber adjacent the periphery of said rotary shield, formed with coolant discharge openings disposed around its inner periphery in circumferentially spaced relation, entending radially inward between said rotary shield and said transparent viewing window, for directing a coolant medium across the adjacent surfaces of said shield and said window during rotation of said shield, for escape of said coolant medium through said sight openings and between the periphery of said shield and said circular supporting frame, and means for supplying a coolant medium into said coolant discharge conduit.

5. In a high temperature shielded observation device, an annular support having a circular observation opening therethrough, said support having a drive shaft extending centrally therethrough, adapted to extend toward a high temperature region in front of said opening, a circular heat insulating disk fixed on said drive shaft for insulating said observation opening against the heat from said region, said heat insulating disk being rotatable in said opening having a periphery closely defining the edge of said opening and radially disposed sight openings therethrough extending from points adjacent the central portion of said disk to points adjacent its periphery, said openings being circumferentially spaced around the rotative axis of the disk at different radial distances from said central portion to uniformly scan a circular observation area concentrically disposed in said observation opening between the innermost and radially outermost sight openings during rotation of said disk, a transparent heat resistant panel fixed in said support in back of said disk, in spaced parallel relation to said disk to provide a coolant receiving chamber, and for observing the rear surface of the disk and observation through said sight openings throughout said circular observation area during rotation of said disk, an outer circular coolant discharge conduit fixed in said chamber, extending around the same outwardly of the periphery of said observation area, an inner circular coolant discharge conduit fixed in said chamber radially inward of said observation area, connecting coolant supply conduit means between said conduits for establishin communication therebetween, coolant supply conduit means connected to said outer circular coolant discharge conduit, said inner and outer circular coolant discharge conduits having radially disposed coolant discharge apertures formed therein facing each other in circumferentially spaced relation around the conduits for discharging a coolant from said conduits across the adjacent surfaces of said disk and said transparent heat resistant panel, for controlling the temperature of said panel during rotation of said disk, and power means for rotating said drive shaft.

6. Apparatus as set forth in claim 5 in which said openings in said disk are circular openings disposed in circumferentially spaced rows, each row comprising a plurality of circular openings in which the circular openings in each row are spaced at different radial distances from the rotary axis of the disk whereby during rotation of the disk the opening in each row scans a substantially overlapping area to that scanned by the opening in an adjacent row, whereby the complete area between the outermost and innermost holes is scanned during rapid rotation of the disk.

7. Apparatus as set forth in claim 6 in which the outer edges of said opening remote from said coolant receiving chamber are beveled and provides an outwardly flared coolant discharge area for the coolant introduced in said coolant receiving chamber.

8. In a high temperature shielded observation device for observation through a high temperature area having a panel separating the high temperature area from a substantially normal temperature area, and having a circular observation opening therethrough comprising a circular ring support fixed in seal-tight relation in said observation opening, an annular anti-friction bearing extending around the inner surface of said ring, a circular heat insulation disk rotatably disposed on said anti-friction bearing for rotation in said observation opening, said disk having an internal ring gear thereon adjacent its periphery, a drive shaft journalled on said ring, gear means fixed on said drive shaft in back of said disk in meshing relation with said ring gear for spinning said disk at a predetermined rate, a transparent observation disk fixed in said ring in spaced parallel relation to said insulation disk to provide a substantially closed coolant receiving chamber between said insulation disk and said transparent disk, a circular coolant delivery conduit fixed in said coolant receiving chamber concentrically around the outer perimeter portion of said transparent observation disk having its inner periphery pierced at circumferentially spaced points to form radially inwardly disposed coolant delivery apertures for directing a coolant medium in said conduits radially inward across said transparent disk for cooling the same, means for supplying a coolant medium into said conduit, said insulation disk having a plurality of radially slit observation openings therethrough disposed in circumferentially spaced relation, extending from substantially the rotative center thereof to points adjacent the peripheral portion of the transparent disk.

9. Apparatus as set forth in claim 8, in which the outer edge portion of said radially slit observation openings facing the high temperature area are beveled.

References Cited in the file of this patent
UNITED STATES PATENTS 869,118    Wamhoff _____ Oct. 22, 1907
2,932,237    Back _____ Apr. 12, 1960